Figure 1:
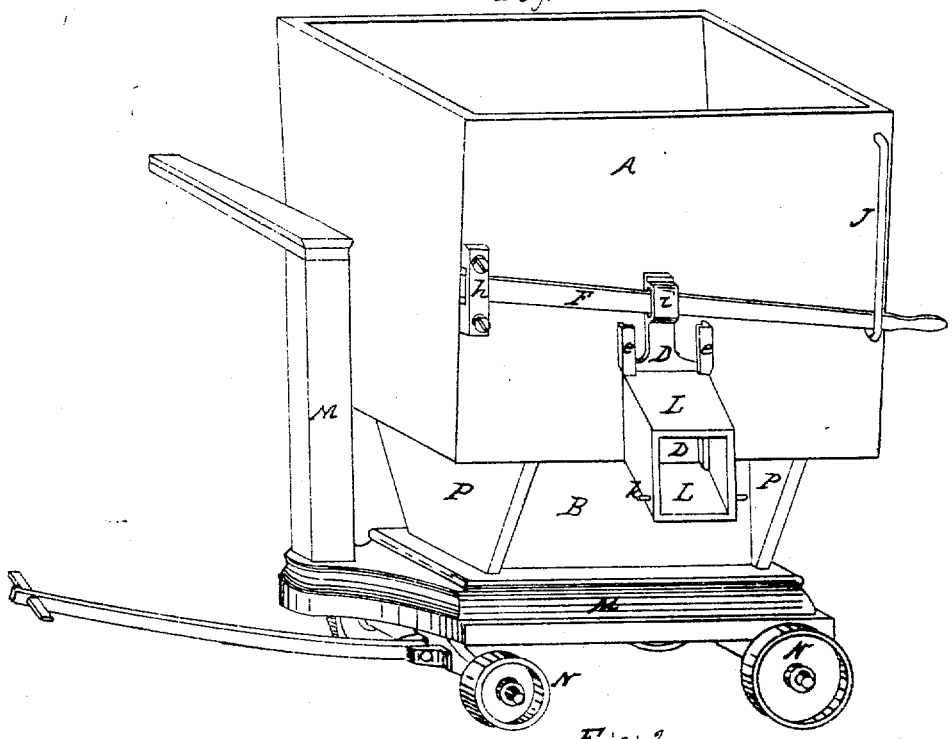
Figure 2:
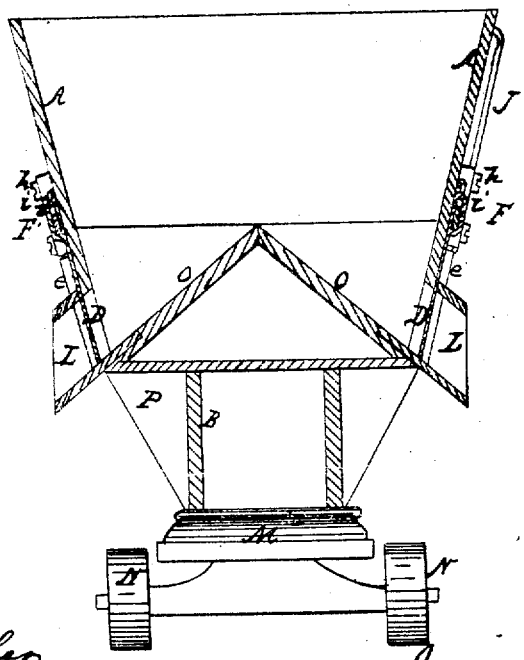

BEST AVAILABLE COPY

Search R

J. M. Fish.

Weighing & Bagging Grain.

No. 2870 Reissued Feb. 18, 1868

Witnesses.

A. M. Wheeler

W. H. Forbush

Inventor.

James M. Fish

By E. B. Forbush

Attorney

BEST AVAILABLE COPY

United States Patent Office.

HARRIET M. FISH, OF NEW YORK, N. Y., ASSIGNEE OF L. K. PLIMPTON AND WILLIAM FOOT, EXECUTORS OF JAMES M. FISH, DECEASED.

*Letters Patent No.* 28,568, *dated June* 5, 1860; *reissue No.* 2,870, *dated February* 18, 1868.

IMPROVEMENT IN MACHINES FOR WEIGHING AND BAGGING GRAIN.

The Schedule referred to in these Letters Patent and making part of the same.

TO ALL WHOM IT MAY CONCERN:

Be it known that JAMES M. FISH, of the city of Buffalo, county of Erie, and State of New York, invented a certain new and useful Improvement in Apparatus for Weighing and Bagging Grain, Ground Feed, Beans, Seed, and other produce; and I do hereby declare that the following is a full, clear, and exact description thereof, reference being had to the accompanying drawings, and the letters of reference marked thereon.

This invention consists of a grain-bin, either of metal or wood, having an appropriate spout or valve upon either side to facilitate the process of discharging the grain or other produce into bags after it is weighed, and the combination of such grain-bin with a weighing-scale, in manner substantially as hereinafter described.

To enable others skilled in the art to make and use this invention, I will proceed to describe the construction and operation of the same.

Figure I is a perspective view of this improvement.

Figure II is a transverse section of the same.

Letters of like name and kind refer to like parts in each of the figures.

The grain-bin, although an entirety, may be described of two parts, A and B, the part B being made to conform to the size of the platform of the ordinary platform-scale upon which the drawing shows it standing. The part A is made much longer and wider than the part B, so that it will overhang the part, as represented in the drawings. It also gradually widens as it rises, so as to increase its capacity for holding grain. It has a spout upon either side for conducting the grain into the bag, as represented at L. D represents a gate or valve, which is raised or opened to allow the grain, ground feed, beans, or seed to pass from the bin into the bag after the same has been weighed, and is closed when the bag is filled. It slides in grooves between the guides *e e*. It is worked by means of the hand-lever F. The lever F is hinged to the side of the bin, as shown at *h*, and passes through a slot in the top of the gate D, as shown at *i*.

J represents a guide-bar connected to the side of the bin for guiding the movable end of the lever in its movement when opening and closing the gate. *k k* are pins or hooks projecting from the spout L for the purpose of connecting the bag to the spout. M represents an ordinary platform-scale supported upon the wheels N. The bottom of the bin is elevated in the centre, with descending surfaces converging to the spouts, as shown at O O, Fig. II, so that all of the grain in the bin will, by its own gravity, pass off through the spout L. P P represent end-pieces of the part B widened out, so as to form braces, or a wider support for the part A.

In actual practice this apparatus is a great labor-saving improvement. In handling and weighing large quantities of grain for shipment or transportation, it is a desideratum to be able to weigh the grain in bulk, and quickly and easily put it in bags after it is weighed, and thereby avoid the necessity of weighing and reweighing the bags. The improvement accomplishes these purposes. It can be easily moved from place to place to receive the grain from the bins as it is deposited in the mill, elevator, or storehouse. The bin A, being filled with grain, seed, or other produce, and standing upon the scale, it is quickly weighed. A bag is then hooked on to each spout, the gates raised, and the bags allowed to fill. Then the gates are closed. The bags, when filled, are set aside, and other bags hooked on to the spouts and filled as before, and so on until the grain is all drawn out of the bin. The bottom of the bin being made higher in the middle, converging downwards to the spouts, the grain or other produce will run out, of its own gravity, and be divided in its passage, so that an equal quantity will run out at each spout, and the bin will remain equally balanced upon the scale until the grain is all drawn out.

The valves or gates are easily worked by hand by means of the lever, so that the passage of the grain may be quickly stopped when the bag is full, and as quickly opened when an empty bag is hooked on to the spout to be filled. Its portability enables it to be used in all parts of a large storehouse, mill, or elevator most accessible to the grain in store. I have used it for more than a year, and have found it to be very convenient and useful.

What is claimed as the invention of the said JAMES M. FISH, is—

1. The hopper A A fitted with a sloping bottom, and with a bagging-spout or spouts and gate or gates on the side or sides of said hopper to regulate the flow of grain, substantially as described.

2. The use of said hopper, so fitted with sloping bottom, spouts, and gates, in combination with a weighing-scale, substantially as described.

HARRIET M. FISH.

Witnesses:

AMOS BROADNAX,

PETER D. KENNY.